United States Patent [19]

Fillman et al.

[11] Patent Number: 5,104,251

[45] Date of Patent: Apr. 14, 1992

[54] FITTING ASSEMBLY FOR A COMPOSITE STRUCTURE

[75] Inventors: Gregory L. Fillman, Renton; Richard W. Randall, Seattle, both of Wash.

[73] Assignee: Heath Tecna Aerospace Company, Kent, Wash.

[21] Appl. No.: 510,013

[22] Filed: Apr. 17, 1990

[51] Int. Cl.$^5$ .............................................. F16B 7/08
[52] U.S. Cl. ................................. 403/191; 403/233; 403/396; 403/404; 52/733
[58] Field of Search ............................ 403/233–235, 403/240, 241, 247, 179, 185, 186, 188, 265, 267, 270, 410, 396, 191, 391, 399, 24, 190, 404, 187, 230; 52/733, 729

[56] References Cited

U.S. PATENT DOCUMENTS

| | | | |
|---|---|---|---|
| 549,192 | 11/1895 | Garbesi | 403/396 X |
| 792,708 | 6/1905 | Kamerer | 403/396 X |
| 1,238,316 | 8/1917 | Kamp et al. | 403/178 |
| 3,297,063 | 1/1967 | McGuire | 403/233 X |
| 4,467,549 | 8/1984 | Dequet | 403/391 X |
| 4,507,011 | 3/1985 | Brown | 403/404 |

Primary Examiner—Peter M. Cuomo
Attorney, Agent, or Firm—Christensen, O'Connor, Johnson & Kindness

[57] ABSTRACT

An apparatus and method for securing fittings to composite structures such as those composites formed out of resin-embedded fibers is disclosed. The invention includes the use of support structures wrapped around the fittings such that the support prevents the fitting from movement when a compression load is applied thereto. The support serves to transfer the force of the compression load into the entire body of the composite structure so that the force will be absorbed by the structure. In one embodiment of the invention, the support structure comprises a composite fiber tow formed of high tensile strength fibers impregnated with a matrix material. The composite fiber tow is fibers wrapped around the fittings to form suspension strands. As the matrix material cures the composite fiber stiffens to hold the fitting in place against the composite structure.

39 Claims, 4 Drawing Sheets

FITTING ASSEMBLY FOR A COMPOSITE STRUCTURE

FIELD OF THE INVENTION

This invention relates generally to support structures formed out of composite materials such as fiber-epoxy composites, and, more particularly, to an arrangement for securing fittings to composite structures.

BACKGROUND OF THE INVENTION

Composite structures are being used with increasing frequency as structural elements to provide mechanical support or linkage in environments where metal members were previously used. A typical composite structure is formed from high-strength fibers that are woven together and embedded in matrix material to form a structural member. Some composite structures are, for example, formed of carbon fibers that are imbedded in a epoxy resin matrix. An advantage of composite structures over identically shaped metal pieces is that the composites have the same or greater mechanical strength as the metal pieces yet weigh substantially less. Still another advantage of composite structures is that they can cost much less to manufacture than the available high-strength, low-weight metal alloys fabricated for the same purpose. Thus, the use of composite structures for support members, linkages and the like is becoming very popular in the aerospace industry and other industries where both weight and cost economization are important design considerations.

One factor that has limited the use of composite structures is that it has proved difficult to attach composites to other structural elements. Composite structures, like many other structural elements, are secured to other structural elements by metal pieces known as fittings. The fittings, in combination with other, complementary, fittings or fasteners, secure the individual structural elements together. There are a number of reasons why attaching composite structures has been a formidable task. Many composite structures cannot simply be drilled so that a fitting or fastener can be installed in the drilled hole. This is because loads, and more specifically, bearing or compression loads, are transferred by the fitting directly to the matrix material adjacent the hole. The matrix material often has a low bearing strength and will fatigue under the force of this load. Moreover, the drilling cuts the fibers in the vicinity of the hole, which causes the composite to lose strength.

Other problems arise when providing composite structures with fittings because many composites, especially those formed of fiber, though quite strong in tension are relatively weak in compression. In other words, many composites, while quite strong when subjected to pulling or tension load, have a tendency to break down when subjected to a bearing load. Thus, composites provided with bushings or other fittings tend to be quite strong and wear-resistant as long as the fittings and adjacent structures are subjected to tension loads. However, when the same composite and fitting assemblies are subjected to a compression load, the strength of the assemblies are limited by the bearing strength of the composite material. If these composite structures are subjected to sufficient bearing loads, they may eventually fracture and be useless for the purpose for which they were intended.

A number of techniques have been tried to provide composite structure-fitting assemblies that are resistant to bearing loads. One technique has been to provide doublers, which are additional layers of composite material, in the vicinity of the fittings in order to increase the bearing surface area and thus reduce the bearing stress. A disadvantage of this technique is that in order for the composite structure to be sufficiently strengthened, the doublers must be relatively thick in comparison to the rest of the structure. This increases the overall size and weight of the structure, so as to significantly reduce the advantages of its use.

Still other techniques to provide composites with fittings have included using adhesives to bond fittings in place. Bonded joints have proven unsatisfactory because many adhesives and matrix materials exhibit a rather low shear strength and in many situations would be exposed to relatively high shear forces. Furthermore, bond joints only work well within narrow temperature ranges. This is due to both the breakdown of the adhesive and because differences in the thermal expansion-contraction characteristics of the adjacent metal and composite stress the bond. Bond joints are also known to break down when subjected to contaminants, such as hydraulic fluid, which are unavoidably present in many mechanical environments. There have also been attempts to bolt or mold fittings to composite structures. Bolting fittings into place requires drilling into the composite, which, as previously discussed, almost always results in its weakening. Composite structures with fittings molded in place are typically subjected to both tension and compression forces which must be sheared into the composite along the composite fitting interface. This interface is limited in size by the ultimate shear strength of the matrix material.

Moreover, bonded fittings, bolted fittings, and molding fittings each require that the actual metal fitting be large-sized in order to ensure that the shear surface or bearing surface is large enough to adequately dissipate the loads throughout the composite structure. This significantly increases the weight of these assemblies. Consequently, the weight savings of composite structure-fitting assemblies becomes trivial when compared to all metal structures, and the advantages of using such assemblies becomes marginal.

SUMMARY OF THE INVENTION

This invention relates to a system for attaching a fitting to a composite structure. More particularly, the invention provides a system for attaching a fitting to a composite structure so that both the fitting and the structure are able to withstand the forces to which they are subjected that are in excess of those that the prior structures can withstand. The system of this invention also does not appreciably increase the weight of the structure-fitting assembly.

The system of this invention includes a set of suspension strands for attaching a fitting to composite structures. In one embodiment of the invention, opposed suspension strands are formed out of a sling of high-strength composite fiber that is wound around the fitting so that the fitting is held against the composite structure. The suspension strands thus secure the fitting so that it is restricted from moving away from the portion of the composite structure it is held against.

An advantage of this system is that the fitting is held between two structures that are relatively strong in tension—the composite structure and the fiber forming the suspension strand. When the fitting is subjected to a tension load, the composite structure restricts its movement in the direction the composite has maximum strength. When the fitting is subjected to a compression load, the suspension strands restrict its movement. Specifically, the suspension strands serve to transfer the compression load away from narrow areas along which the fitting and the structure normally interface to relatively large areas along the width of the composite structure. The compression load is then dissipated throughout a relatively large section of the composite structure. Individual sections of the composite structure are thus exposed to compression loads that they can readily dissipate without fatiguing. This essentially eliminates the possibility that the compression loads can, over time, fatigue portions of the composite structure to the point where they fracture.

Still another advantage of this invention is that the fiber forming the slings is relatively lightweight. The slings forming the suspension strands thus do not add appreciably to the weight of the composite assemblies, which is a principal reason for using composite structures.

BRIEF DESCRIPTION OF THE DRAWINGS

This invention will be pointed out with particularity in the appended claims. The above and further advantages of the invention may be better understood by reference to the following detailed description taken in conjunction with the accompanying drawings in which:

DETAILED DESCRIPTION OF THE PREFERRED EMBODIMENT

Figure 1:
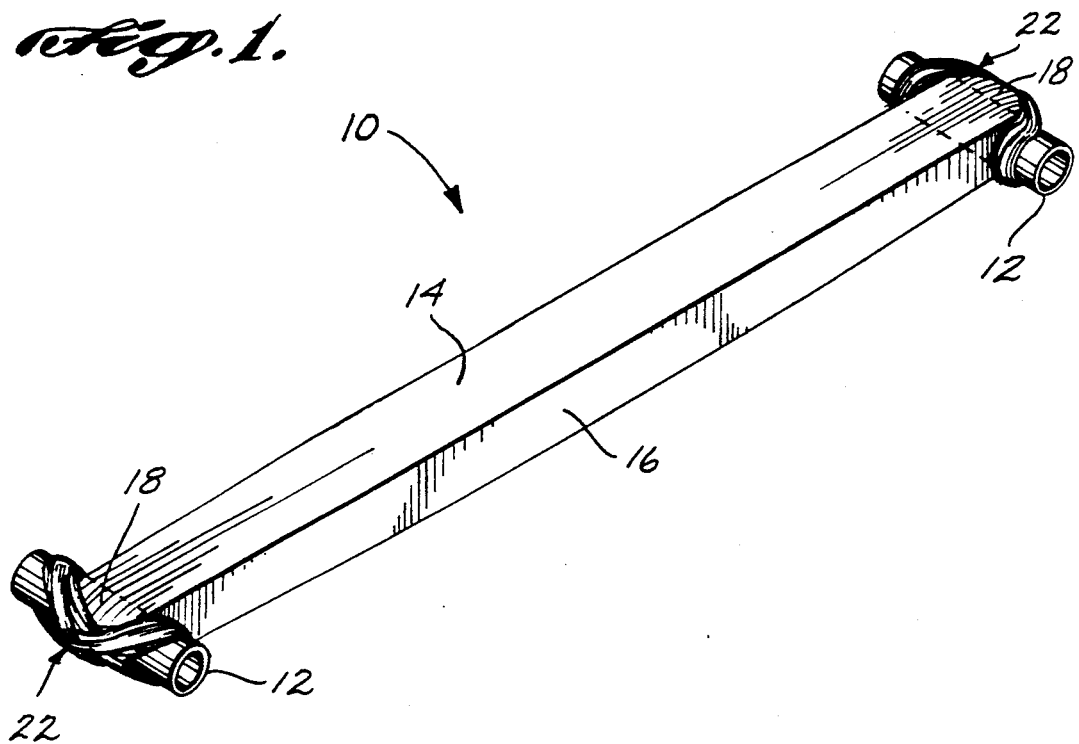
FIG. 1 is a perspective view of a box-type strut having bushing-type fittings attached at both ends according to an embodiment of this invention.
Figure 2:
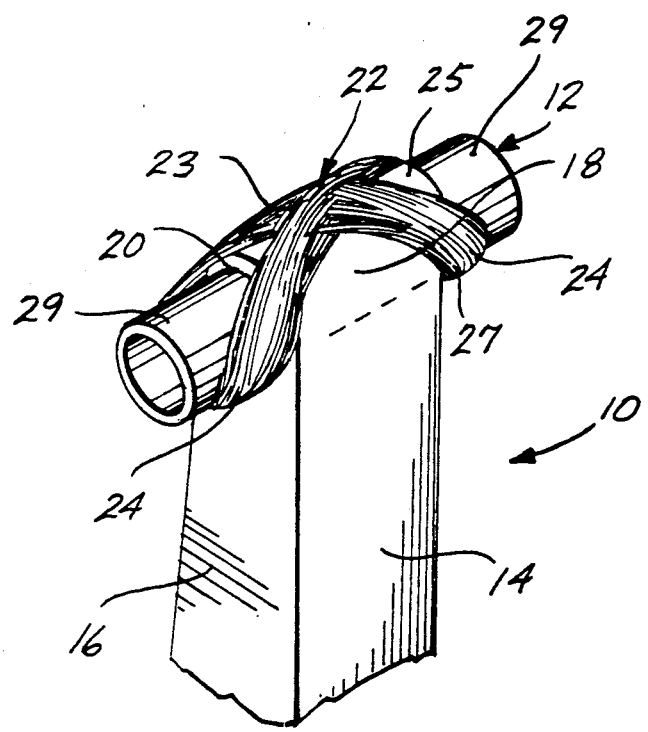
FIG. 2 is a perspective view of the end of the box-type strut of FIG. 1 showing the attachment mechanism of this invention in greater detail.

FIGS. 1 and 2 depict a box-type strut 10 wherein the system of this invention is used to attach fittings, in the form of cylindrical, hollow bushings 12, to the ends of the strut. The strut 10 includes a pair of spaced-apart flanges 14 (one shown in each drawing) that are connected together along their lateral edges by webs 16 (one shown in each drawing) that extend therebetween. The longitudinal edges of the flanges are connected together by arches 18 of generally semicircular shape. The flanges 14, webs 16 and arches 18 are all formed out of composite materials such as high tensile strength glass or carbon fibers bound together in a matrix of epoxy or other suitable resin as is well known in the art.

The arches 18, in combination with the longitudinal edges of the webs 16, form openings 20 in which the bushings 12 are disposed.

The system of attachment of this invention uses slings 22 to fasten the bushings 12 in the strut openings 20. The slings 22 hold the bushing against the inside surface 21 (FIG. 3) of the arches 18. As illustrated in FIG. 2, each sling 22 is formed out of a composite fiber tow 23 that is wound around exposed sections 29 of the bushing 12 that extend out of the strut opening 20 and the outer surface 25 of the arch 18. The slings 22 form a figure-eight such that there are two suspension strands 24, one around each exposed section 29 of the bushing 12. The sling 22 is wrapped tightly around the bushing 12 so that the bushing is held against the arch 18 and restricted from moving towards the webs 16.

Figure 3:
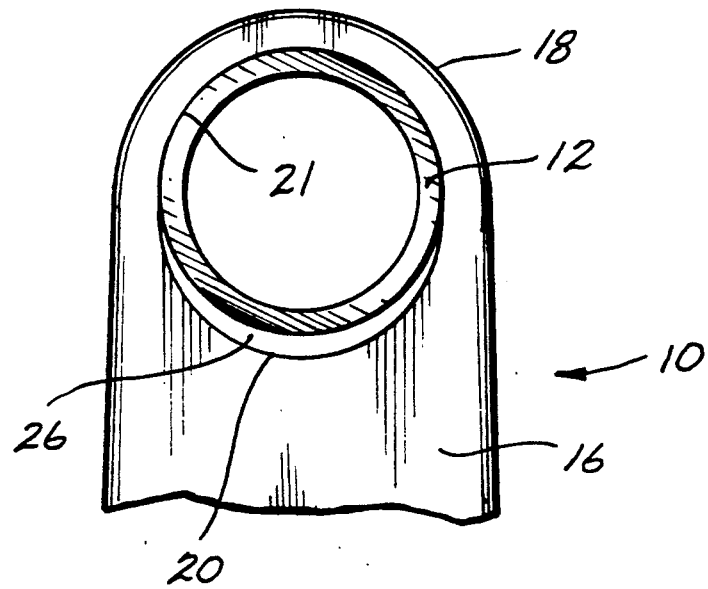
FIG. 3 is a side view of the end of the box strut of FIG. 2 showing the relationship between the opening defined in the strut and the bushing.

As depicted in FIG. 3, the strut 10 is designed so that the bushing opening 20 has a slightly eccentric shape. Specifically, the strut 10 is formed so that when bushing 12 is disposed in the opening 20, there is a slight gap 26 between the bushing and adjacent composite structure surface against which compression loads from the bushing would normally be applied. In the depicted end-located opening 20, the gap 26 is located between the bushing 12 and adjacent edge of the web 16. The suspension strands 24 suspend the inside surface 21 bushing 12 against the arch 18 above the web 16 so that the gap 26 is established between the bushing and the web. In the illustrated embodiment, the gap 26 is crescent-shaped and has a maximum width of approximately 5 mm.

The composite fiber tow 23 used to attach the bushing 12 is formed from a continuous length, or tow, of high tensile strength fiber 27 impregnated with a resin that has completely cured. Typically, the fiber 27 is formed from carbon, ceramic or glass, which have sufficient tensile strength to secure the bushing 12. A suitable fiber 27 is the carbon fiber AS4 manufactured by the Hercules Fiber Company of Magna, Utah. This fiber has a tensile strength of approximately 580,000 psi. The fiber 27 is impregnated with matrix forming material, such as epoxy or other suitable resin, so that after the material cures, the composite fiber tow 23 forms a rigid structure. Prior to the resin curing, the composite fiber tow 23 is wrapped around the strut 10 and bushing 12 starting at the top of the arch 18 so that first one suspension strand 24 is formed, and then the other loop 24 is formed. The composite fiber tow 23 may be repeatedly wrapped around the bushing 12 so as to form the suspension strands 24 out of multi-layered loops in order to give the sling 22 added strength. The composite fiber tow 23 forming the sling 22 is then cut and tied when the cord is under the end of the bushing 12. Typically, a tensioner is used to wrap the composite fiber tow 23 around the strut 10 and bushing 12 to form the sling 22. The tensioner is used so that the composite fiber tow 23 is already stressed when wrapped around the bushing 12 such that the individual fibers forming the tow are held straight and are not kinked. In a preferred embodiment, the composite fiber tow 23 is wrapped around the strut 10 and bushing 12 with approximately 10 to 20 lbs. of tension. Once the composite fiber 23 is wrapped, the impregnated resin is cured. The composite fiber 23 then securely holds the bushing 12 in place against the inside wall of the arch 18.

Figure 4:
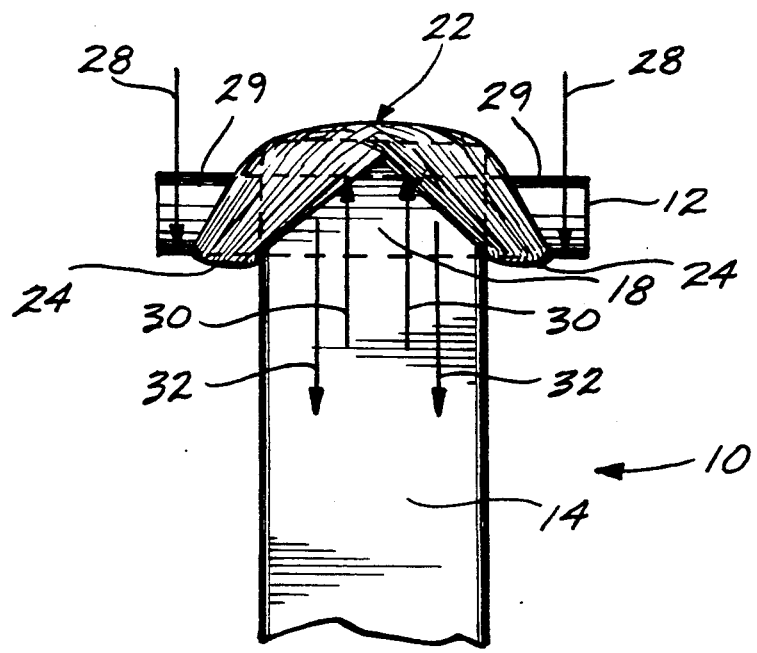
FIG. 4 is a front view of the end of the box strut of FIG. 1, wherein the force transfer that takes place when a compression load is applied to the bushing is illustrated.

FIG. 4 illustrates how when a compression load is applied to the bushing 12, the sling 22 dissipates the load. A compression load, illustrated by arrows 28, applies a force against where the bushing 12 abuts the lower ends of the suspension strands 24. Normally this force would transfer to the web 16. The suspension strands 24 secure the bushing 12 so that, instead, it is separated from the web by the gap 26 (FIG. 3). The bushing 12 thus does not impose a force on the composite material forming the web 16. The suspension strands 24 transmit the force of the compression load to the top of the arch 18 as represented by arrows 30. The arch 18, in turn, transmits the force of the compression load into the flanges 14 as represented by arrows 32. The flanges 14 have sufficient strength to absorb the force of the load since the force is distributed along the entire width of the flanges. The strut 10-and-bushing 12 assembly is thus able to absorb compression loads with less regard to the bearing strength limitations of the composite.

Another advantage of the sling 22 of this invention is that it is relatively lightweight. Thus, the sling 22 can be used to secure bushings 12 or other fittings to the strut 10 without appreciably adding to the overall weight of the composite structure-fitting assembly. For example, a 460 mm long, 167 g box-section carbon/epoxy composite with less than 5 g of suspension strands on each end has been shown to carry over 17,000 newtons in axial compressive loading.

Figure 5:
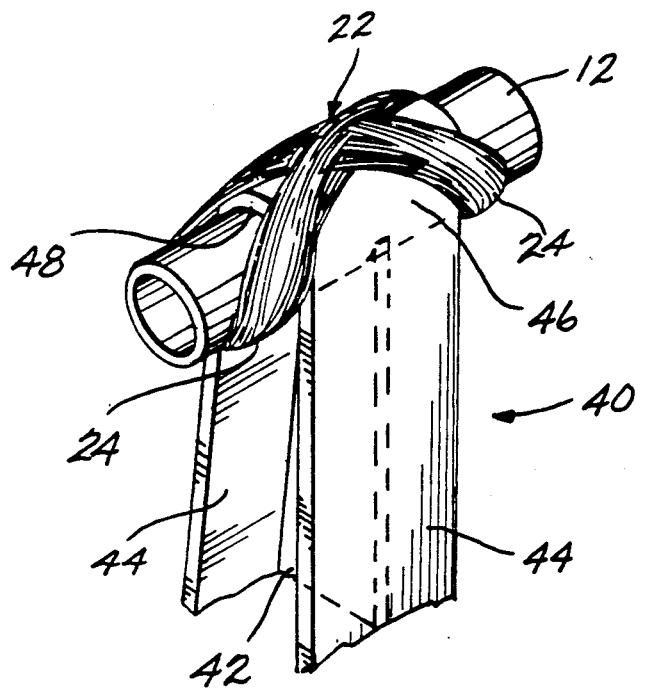
FIG. 5 is a perspective view of the end of an I-beam strut having a bushing attached according to the apparatus of this invention.

The attachment system of this invention may be used with structural members other than the illustrated strut 10. As depicted in FIG. 5, an I-beam type strut 40 may be provided with a bushing 12 that is attached with the sling 22 of this invention. The depicted strut has a single center-located web 42 and two open-end flanges 44 integrally attached to each edge of the web. An arch 46 extends around the end of the web 42 connecting the flanges 44. The end of the web 42 is spaced from the arch to form an opening 48 in which the bushing 12 is disposed. The sling 22 is used to secure the bushing to the strut 40 in a manner identical to that of the first embodiment of this invention. The opening 48 in the strut 40 is shaped similarly to opening 20 in the strut 10 of the first embodiment such that there is a small gap (not illustrated) between the bushing 12 and the web so as to prevent the bushing from exerting a load on the web 42.

Figure 6:
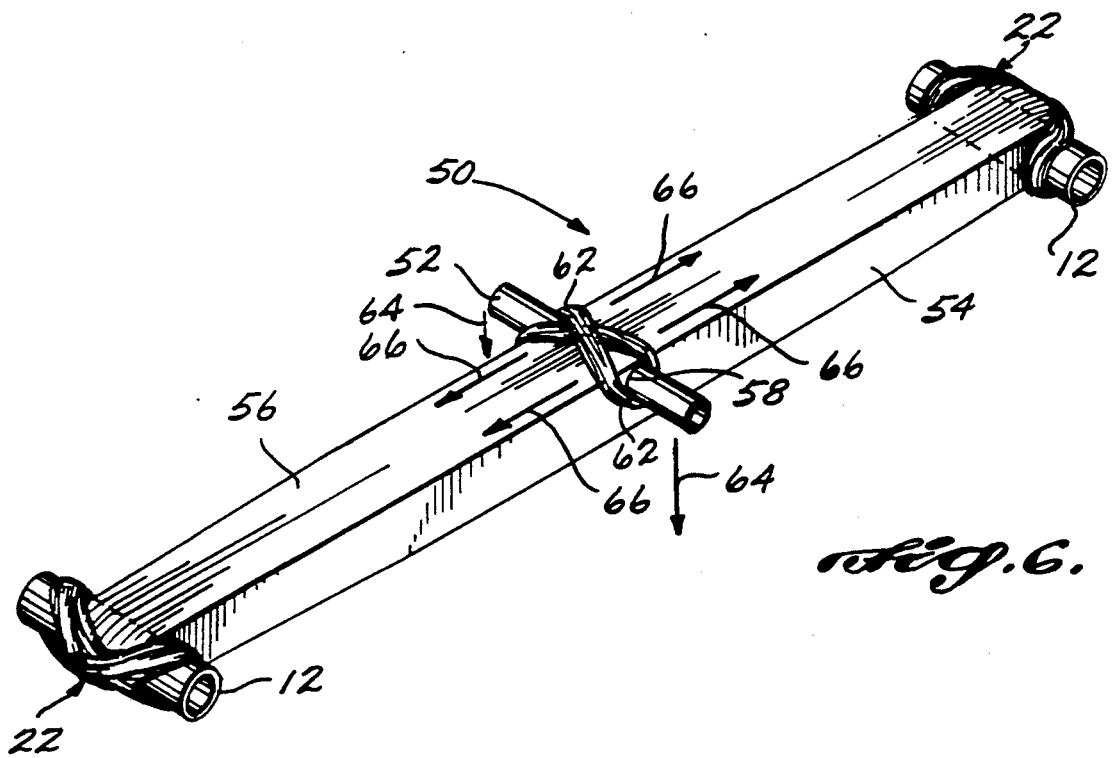
FIG. 6 is a perspective view of a box strut with an intermediately located thrust lug bushing attached thereto according to the attachment system of this invention.

As illustrated in FIG. 6, this invention may also be used to secure a fitting located along the midpoint of a structural member. In this embodiment, a box strut 50 is shown with a lateral thrust bushing 52 located at midlength on the strut. The strut 50 in this embodiment of the invention has two webs 54 (one shown) and two flanges 56 (one shown), as depicted in the first embodiment of the invention. The webs 54 are formed with concentric openings 58 (one shown) adjacent one of the flanges 56. The bushing 52 is disposed in the openings 58 such that it extends out from either side of the strut 50.

The bushing 52 is secured to the strut by a sling 60. The sling 60 is wrapped such that it has two suspension strands 62 that extend around exposed sections of the bushing, and, more specifically, the bushing surfaces opposite the adjacent flange 56. The sling 60 is wrapped around the bushing 52 and the outer surface of the flange 56 in a manner identical to that in the first embodiment of the invention. The web openings 58 are, as in the previous embodiments of the invention (see FIG. 3), eccentrically formed so that opposite the adjacent flange 56 the bushing 52 will be spaced a slight distance away from the webs 54.

When a lateral up load is applied on the bushing 52, the adjacent flange 56 has sufficient strength to withstand the forces of the load. When a lateral down load is applied to the bushing 52, as represented by arrows 64, the suspension strands 62 transfer the forces of the load to the adjacent flange 56. Consequently, the forces of the load are distributed along the entire width of the flange on either side of the bushing, as is represented by arrows 66. The force of the load is thus dissipated throughout the width of the flange 56.

Figure 7:
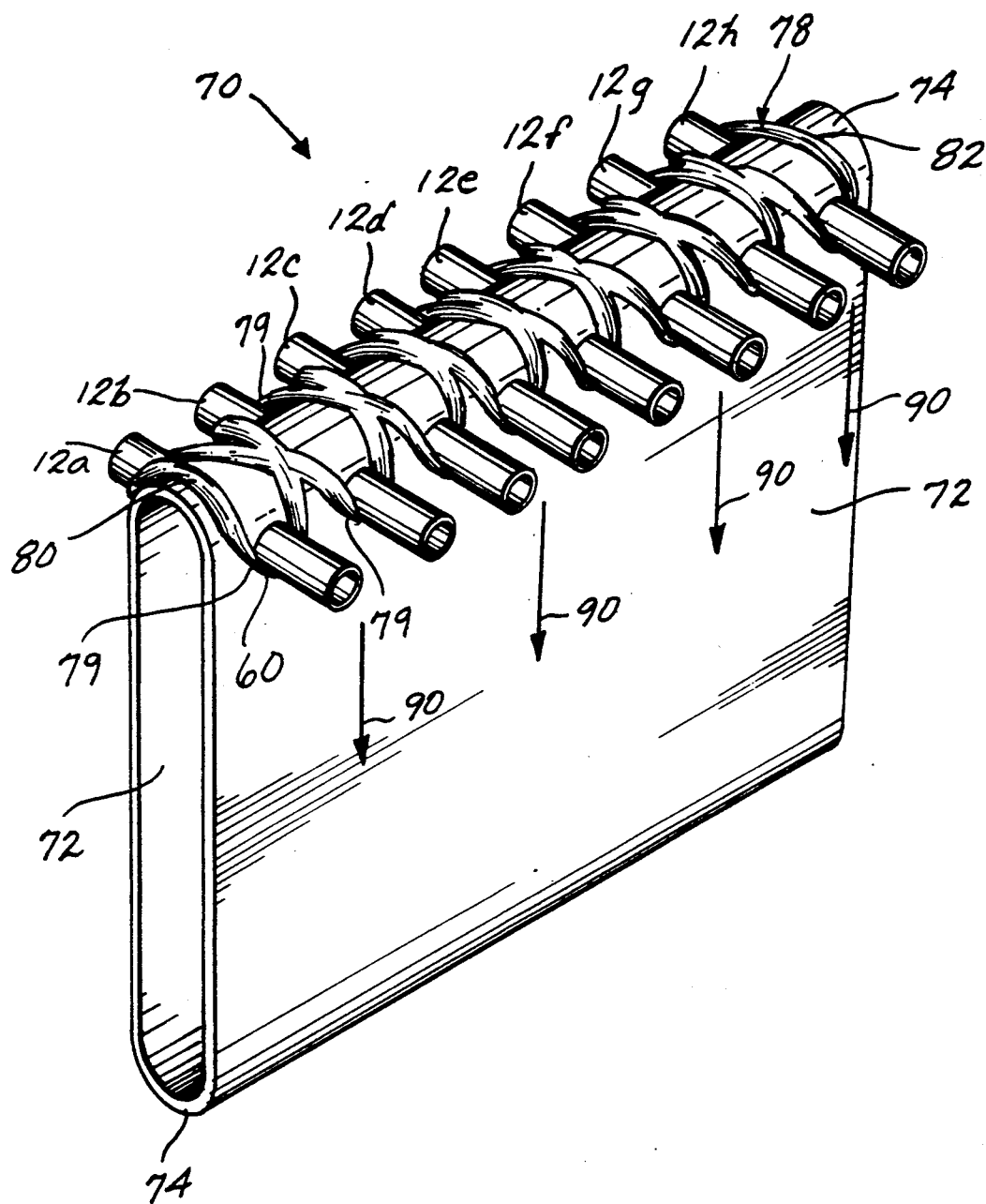
FIG. 7 is a perspective view of a composite panel provided with a number of bushings attached at one edge thereof according to the system of this invention.

FIG. 7 depicts how a panel 70 formed out of a composite material can be provided with fittings 12a, b, c . . . according to this invention. The panel is formed from composite material and includes two parallel spaced-apart sheets 72 of composite material. The sheets are joined along their lateral edges by semicircular arches 74 also formed of composite material. The longitudinal edges of the sheets are shown open for purposes of illustration, though, in practice, they may also be joined by arches. Similarly, while the space between the sheets 72 is depicted as empty, a fill or core material may be provided in this space. The fill material may be provided in order to improve the panel's insulating characteristics and/or to strengthen and stiffen the panel 70.

In the illustrated embodiment, the bushings 12 are mounted along one lateral edge of the panel 70. The sheets 72 are provided with pairs of concentric holes 76 in which the bushings 12 are disposed. The bushings 12 are secured to the panel 70 by a composite fiber tow 78, similar to the first described composite fiber tow 23, that forms a number of suspension strands 79. The composite fiber tow 78 is wrapped around the bushings 12 starting at one end of the panel 70, for example, at the point indicated by identification number 80. The composite fiber tow 78 is then wrapped under an exposed section of the first bushing 12a and over the arch 74 to form the first suspension strand 79. The composite fiber tow 78 is then wrapped around the opposite-side exposed section of the adjacent bushing 12b and in a crisscross pattern around the exposed sections of the remaining bushings 12c, 12d, . . . and the outer surface of the arch 74 until it is looped under the last bushing 12h at the opposite end of the panel 70. The composite fiber tow 78 is then brought directly over the arch 74 as represented by the crossing point indicated by identification number 82. The composite fiber tow 78 is looped under the opposite-side exposed section of the last bushing 12h and then wrapped in a crisscross pattern under the exposed bushing sections not provided with suspension strands 79 in the first half of the wrapping process. The composite fiber tow 78 may be repeatedly wrapped about the bushings 12 to provide as much strength as necessary to secure them. After wrapping, the resin in the composite fiber tow 78 is cured which stiffens the cord so that the bushings 12 are firmly secured in place.

When the panel 70 is subject to tension loads, the arch 74 has sufficient strength to withstand the forces of the load. When the panel 70 is subjected to compression loads, the circular shape of the arch 74 prevents fiber forming the composite fiber tow 78 from being cut or failing prematurely as would occur if the panel was provided straight corner edges. Instead, as is represented by arrows 90, the suspension strands 79, which extend longitudinally on either side of each bushing 12, transfer the compression load so that it is distributed along the length of the sheets 72. The inherent strength of the composite material is such that when the load is distributed along the length of the panel 70, the sheets 72 are able to absorb the load.

It will be understood that the foregoing description is for the purposes of illustration only. It will be readily recognized that this system for securing fittings to composite structures can be practiced with alternative structures and fittings and by alternative means than are disclosed by way of the example above. For example, in some alternative embodiments of the invention it may be possible to form the composite fiber tow by first wrapping an appropriate fiber about the fittings and then imbedding an appropriate resin into the fiber so that when the resin cures the composite fiber tow has the desired stiffness. In some embodiments of the invention it may also be desirable to wrap or braid the fiber used to form the composite fiber tow. In still other versions of the invention other rigid composites or even metal brackets may be substituted for the disclosed composite fiber tow to provide the suspension strands necessary to transfer the compression loads. Also, while in the disclosed embodiments of the invention the suspension strands are depicted as being wrapped completely wrapped around the underside of the associated fittings, in other embodiments of the invention the suspension strands may only extend partially around the associated fittings. Furthermore, while the illustrative fittings have been simple bushings, it is clear that this invention can be used to fasten other types of fittings. For example, it would be obvious to substitute the hollow bushing for solid fittings, such as those having threaded protuberances for coupling to complementary fittings or fixtures.

Moreover, this invention may also be used to attached non-metallic fittings to composite structures. For instance, the invention could be used to attach composite fittings to a composite structure wherein the fittings may comprise one or more protuberances or teeth formed integrally with another structure that are designed to be inserted into an opening formed in the composite structure. In such an arrangement, the sling or other support structure can be used to urge the teeth towards one edge of the composite in order to ensure that the compression load is transferred into the body of the composite structure. Furthermore, while in the disclosed embodiments of the invention the bushings are shown to extend approximately equidistantly on either side of the composite structure, this feature is not necessary in order to practice the claimed invention. In some versions of the invention, it may be possible to attach the support structure to a fitting that only extends from one side of a composite structure. Alternatively, this invention could be used to attach asymmetrically shaped fittings to composite structures wherein the fittings have a short side around which one loop of a figure-eight type sling is wound.

Therefore, it is an object of the appended claims to cover all such modifications and variations as come within the true spirit and scope of the invention.

The embodiments of the invention in which an exclusive property or privilege is claimed are defined as follows:

1. A structural assembly comprising:
   a matrix-fiber composite structure element having an outer surface and an opposed inner surface;
   a fitting disposed against said composite structural element inside surface, wherein said fitting has first and second spaced apart ends; and
   a suspension strand attaching said fitting to said composite structural element, wherein said suspension strand extends from around said fitting first end, over said composite structural element outer surface, around said fitting second end and over said composite structural element outer surface so as to cross a portion of said strand initially extended around said composite structural element outer surface so that when a force urges said fitting away from said composite structural element inner surface, a tension load is imposed on said support strand.

2. A structural assembly of claim 1, wherein said fitting has two axially aligned extended sections wherein said extended sections project away from opposite sides of said composite structural element opening adjacent said outer surface, and said suspension strand is in the form of two integrally connected loops formed of continuous strands of fiber, and each said loop extends from said composite structural element outer surface to under a different one of said fitting axially aligned extended sections opposite said composite structural element outer surface, and back to said composite structural element outer surface.

3. The structural assembly of claim 2, wherein said fitting has two axially aligned extended sections, wherein each said extended section projects away from opposite sides of said composite structural element opening adjacent said outer surface, and said support structure includes two suspension strands formed from continuous strands of fiber and each said suspension strand extends from said composite structural element outer surface to under a different one of said fitting axially aligned extended sections opposite said composite structural element outer surface, and back to said composite structural element outer surface.

4. The structural assembly of claim 1, wherein said composite structural element has a flange formed with an outer surface and an inner surface, said fitting is disposed against said flange inner surface and said suspension strand extends over said flange outer surface.

5. The structural assembly of claim 4, wherein said fitting has two axially aligned extended sections, wherein each said extended section projects away from opposite sides of said composite structural element opening adjacent said outer surface, and said suspension strand includes two internally connected loops formed from continuous strands of fiber and each said loop extends from said composite structural element outer surface to under a different one of said fitting axially aligned extended sections opposite said composite structural element outer surface, and back to said composite structural element outer surface.

6. The composite structural assembly of claim 1, wherein said composite structural element has at least two spaced-apart flanges that are integrally connected together and each said flange is formed with an outer surface and inner surface, said fitting is disposed against an inner surface of one of said flanges and said suspension strand extends over an outer surface associated with said flange against which said fitting is disposed.

7. The structural assembly of claim 6, further including a web extending between said flange inner surfaces and said web is spaced from said fitting so as to form a gap therebetween.

8. The structural assembly of claim 7, wherein said fitting has two opposed exposed sections that extend out from the sides of said at least one flange and said support means includes two integrally connected opposed suspension strands each of which extends around a different one of said fitting exposed sections and over said at least one flange outer surface.

9. The structural assembly of claim 6, wherein said fitting has two opposed exposed sections that extend out from sides of said at least one flange and said support means includes two integrally connected opposed suspension strands each of which extends around a different one of said fitting exposed sections and over said at least one flange outer surface.

10. The structural assembly of claim 1, wherein said composite structural element has two flanges that are integrally joined by an arcuate section having an outer surface and an inner surface, said fitting is disposed against arcuate section inner surface and said suspension strand extends over said arcuate section outer surface.

11. The structural assembly of claim 10, further including a web extending between said flange inner surfaces and said web is spaced from said fitting so as to form a gap therebetween.

12. The structural assembly of claim 1, wherein:
said composite structural element is formed with a wall having an outer surface and an opposed inner surface and a second structural section attached to said wall inner surface, and wherein an opening is formed in said second structural surface adjacent said wall inner surface;
said fitting is disposed in said composite structural element opening against said composite structural element wall inner surface; and
said suspension strand extends around said fitting and over said composite structural element wall outer surface.

13. The structural assembly of claim 12 wherein said composite structural element opening is formed so that said composite structural element second structural section is at least partially spaced away from said fitting so as to form a gap therebetween.

14. The structural assembly of claim 12, wherein said fitting has two extended sections that extend out from the opposed sides of said at least one flange and said suspension strand includes two integrally connected loops each of which extends around a different one of said fitting exposed sections and over said composite structural element wall outer surface.

15. A structural assembly comprising:
a matrix-fiber composite structural element formed with an opening and having an outer surface;
a fitting disposed in said composite structural element opening adjacent said outer surface having two axially aligned extended sections, wherein each said extended section projects away from opposed sides of said composite structural element opening adjacent said composite structural element outer surface;
a suspension strand formed of continuous strands of fiber formed into two loops, wherein each said suspension strand loop extends from said composite structural element outer surface to under a separate one of said fitting axially aligned extended sections opposite said composite structural element outer surface and back to said composite structural element outer surface; and
wherein said composite structural element opening is formed so that a gap separates said fitting and said composite structural element opposite said composite structural element outer surface.

16. The structural assembly of claim 15, wherein composite structural element is formed with two openings and said fitting is disposed in said openings such that each said fitting extended section extends out of a different one of said openings and wherein said openings are formed so that a gap separates said fitting and said composite structural element opposite said composite structural element outer surface.

17. The structural assembly of claim 15 wherein said suspension strand is formed of composite fiber.

18. The structural assembly of claims 15 or 17 wherein said composite fiber is wound in a figure-eight shape so as to form said suspension strand loops.

19. The structural assembly of claim 15, wherein said composite structural element is a strut having at least one flange and at least one web integrally connected to said flange wherein said web at least partially defines said opening in which said fitting is disposed such that said fitting extended sections extend out of said opening, and said suspension strand loops are attached to said composite structural element flange.

20. The structural assembly of claim 19 wherein said strut includes two flanges integrally connected to said web such that said flanges are joined by an arch located around an end of said web, said arch and said web defining said opening in which said fitting is disposed, and said suspension strand loops are attached to said arch.

21. The structural assembly of claim 19 or 20, wherein said suspension strand is formed of composite fiber.

22. The structural assembly of claim 21 wherein said composite fiber is wound in a figure-eight shape so as to form said suspension strand loops.

23. A method of attaching a fitting to a matrix-fiber composite structural element having an outer surface, an inner surface and opposed sides comprising the steps of:
mounting a fitting having two coaxially extended sections against the composite structural element inner surface so that said fitting extended sections project away from the opposed sides of the composite structural element;
wrapping a composite fiber comprising a high tensile strength fiber impregnated with a matrix material around said fitting and the composite structural element outer surface in a figure-eight shape so that said composite fiber forms one suspension strand loop about a first one of said fitting extended sections and then a second suspension strand loop about the other of said fitting extended sections, wherein said composite fiber is wrapped around the fitting and the composite structural element outer surface with approximately 10 to 20 pounds of tension applied to said composite fiber; and
curing said matrix material so that said composite fiber secures said fitting to the composite structure element outer surface.

24. A structural assembly comprising:
a matrix-fiber composite structural element in the form of a panel having at least one sheet and a second surface integral with and angularly offset from said first sheet, said panel defining a plurality of openings;
a plurality of fittings wherein one fitting is disposed in each said panel opening and each said fitting has an extended section projecting away from said at least one sheet; and
a plurality of suspension strands for attaching said fittings to said panel, said suspension strands extending from under an extended section of one said plurality of fittings, over said second surface to under an extended section of another of said plurality of fittings.

25. The structural assembly of claim 24, wherein each said fitting has two extended sections such that each said extended section projects from a different side of one of said composite structural element openings and each said extended section is secured to said composite structural element by one of said suspension strands.

26. The structural assembly of claims 24 or 25, wherein said suspension strands are formed of a composite fiber.

27. The structural assembly of claim 24, wherein: said at least one sheet comprises two parallel, spaced apart sheets and said second surface is an arch connecting said sheets and said sheets define pairs of concentric openings adjacent said arch; said fittings are disposed in individual pairs of said openings such that each fitting has an extended section projecting out of each opening; and said fittings are secured to said panel by said suspension strands, each said suspension strand extending from under an exposed section of one of said fittings, over said arch and under an exposed section of a different one of said fitting exposed sections opposite said arch and back to said arch.

28. The structural assembly of claim 27 wherein said suspension strands are formed of a composite fiber.

29. The structural assembly of claim 28 wherein said openings are formed so that a gap separates each said fitting and an adjacent said panel portion defining said opening.

30. The structural assembly of claim 27 wherein said openings are formed so that a gap separates each said fitting and an adjacent said panel portion defining said opening.

31. A composite structural assembly comprising:
a matrix-fiber composite structural element having a flange with an outer surface and an opposed inner surface and a web extending from said flange inner surface, wherein an opening is formed in said web;
a fitting disposed in said web opening, wherein said fitting has first and second spaced apart ends; and
a suspension strand attaching said fitting to said composite structural element, wherein said suspension strand extends from around said first fitting end, over said flange outer surface, around said second fitting end and over said flange outer surface so as to cross a portion of said suspension strand initially extended around said flange outer surface so that when a force urges said fitting away from said flange inner surface, a tension load is imposed on said suspension strand.

32. The structural assembly of claim 31, wherein said fitting has two axially aligned extended sections that project away from said flange and said suspension strand is in the form of two loops, wherein each said loop extends from said flange outer surface to under a different one of said fitting extended sections and back to said flange outer surface.

33. The structural assembly of claims 31 or 32, wherein said web opening is formed so that a gap separates said fitting and a portion of said web opposite said flange outer surface.

34. The structural assembly of claim 31, wherein said web extends from an edge of said composite structural element flange.

35. A structural assembly comprising:
a matrix-fiber composite structural element including a flange having an outer surface and an opposed inner surface, and a web extending from said flange inner surface wherein said web is formed with an opening;
a fitting disposed in said web opening and having two axially aligned extended sections, wherein said extended sections project away from opposed sides of said flange;
a suspension strand attaching said fitting to said composite structural element, wherein said suspension strand is in the form of continuous strands of fiber formed into two integrally connected loops, wherein each said loop extends from said flange outer surface to under a separate one of said fitting axially aligned extended sections and back to said flange outer surface; and
wherein said web opening is formed so that a gap separates said fitting and a portion of said web opposite said flange.

36. The structural assembly of claim 35, wherein said suspension strand is formed of composite fiber.

37. The composite structural assembly of claim 35, wherein said composite structural element has two flanges that are integrally joined by an arcuate section having an outer surface and an inner surface, said web extends between said flanges and said composite structure is further formed so that said web and said arcuate section define said opening, and said suspension strand extends over said arcuate section outer surface.

38. The structural assembly of claim 35, wherein said composite structural element is formed with two webs-wherein said webs are formed with concentric openings in which said fitting is seated.

39. The composite structural assembly of claim 38, wherein said composite structural element has two flanges that are integrally joined by an arcuate section having an outer surface and an inner surface, said web extends between said flanges and said composite structure is further formed so that said webs and said arcuate section define said openings in which said fitting is seated and said suspension strand extends over said arcuate section outer surface.

* * * * *